June 10, 1952  R. H. PARK ET AL  2,599,579
STREAMLINE DEPTH CHARGE
Filed Feb. 1, 1943  7 Sheets-Sheet 3

Inventors
R. H. PARK
A. G. RUSSELL
W. S. MACDONALD
R. R. CROOKSTON

By
Attorney

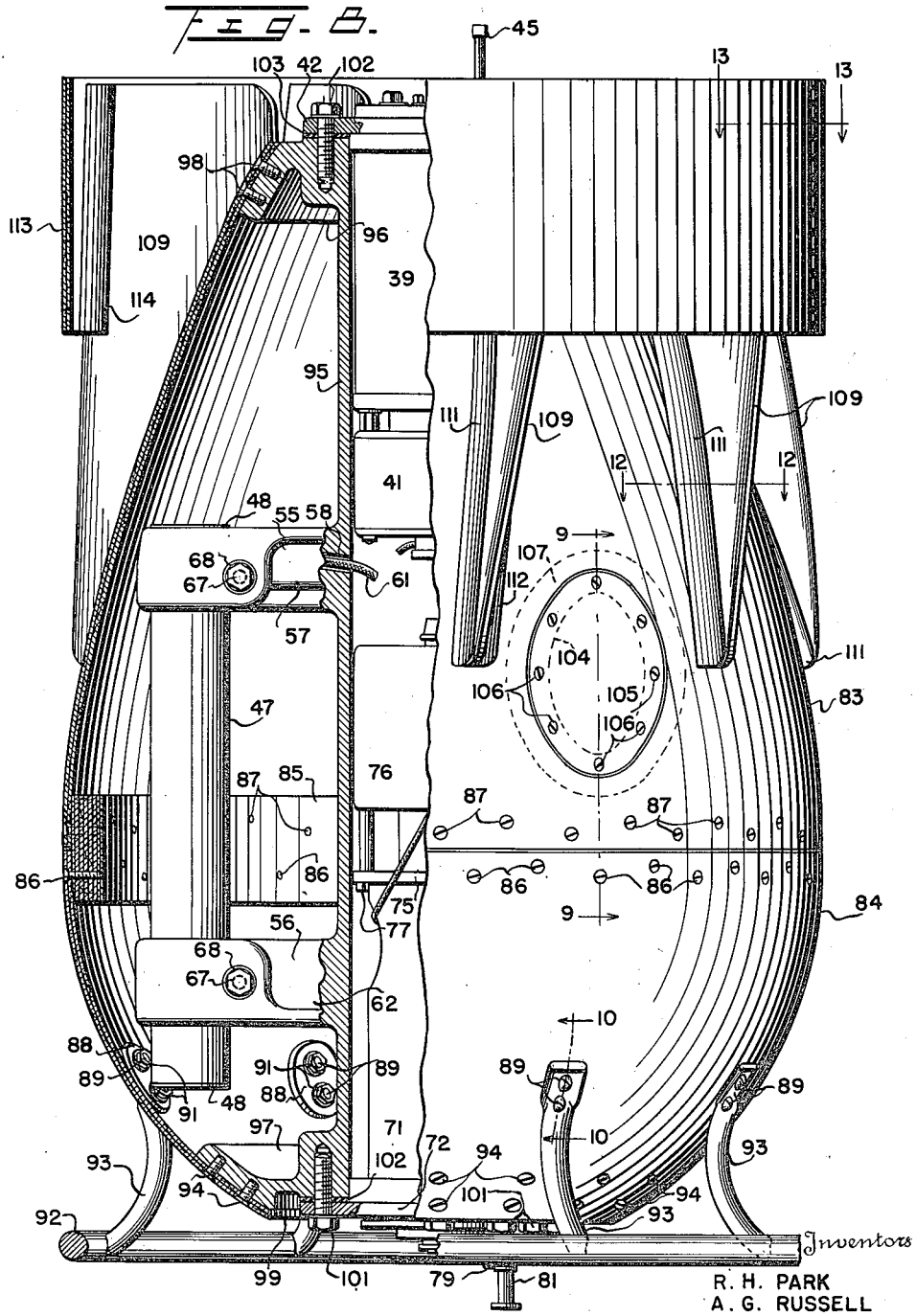

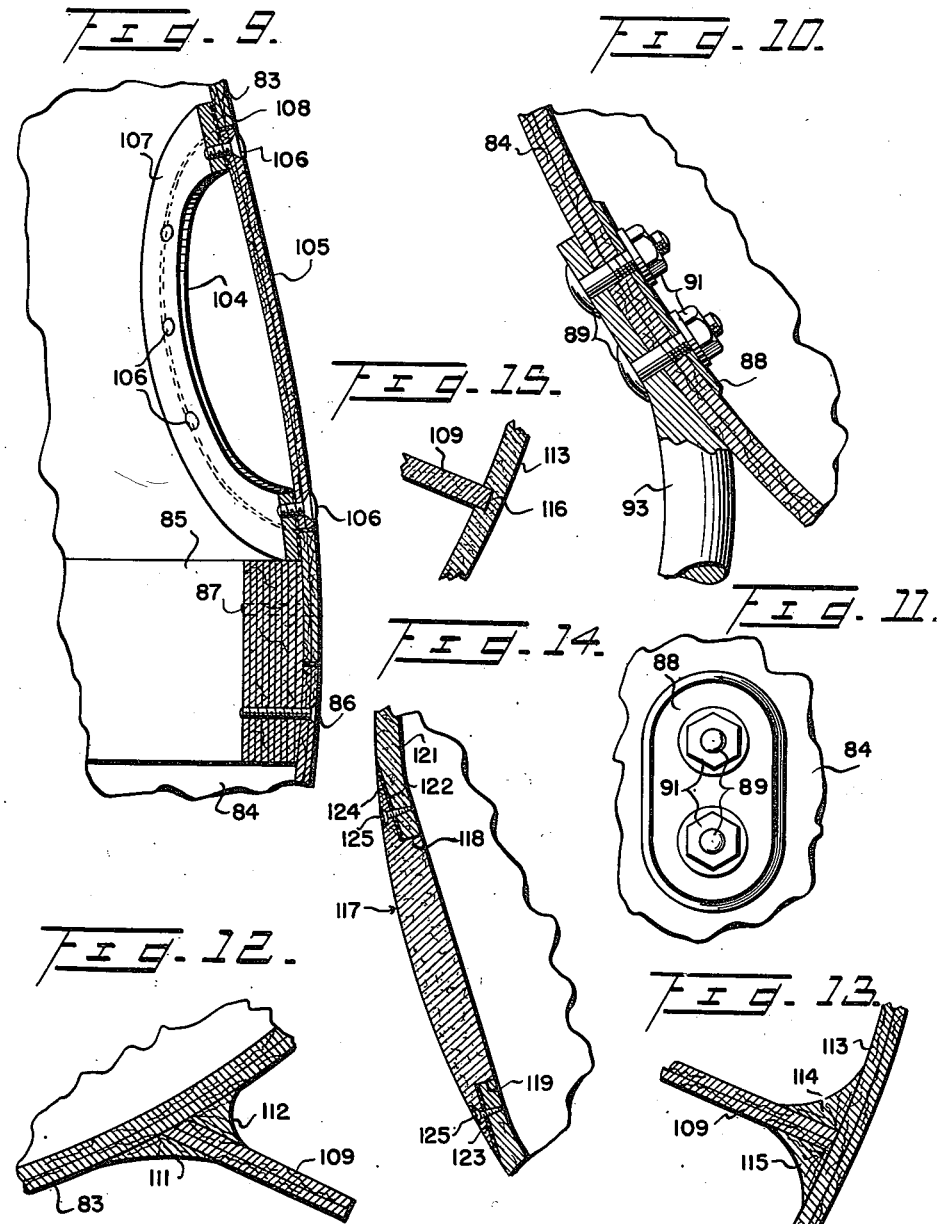

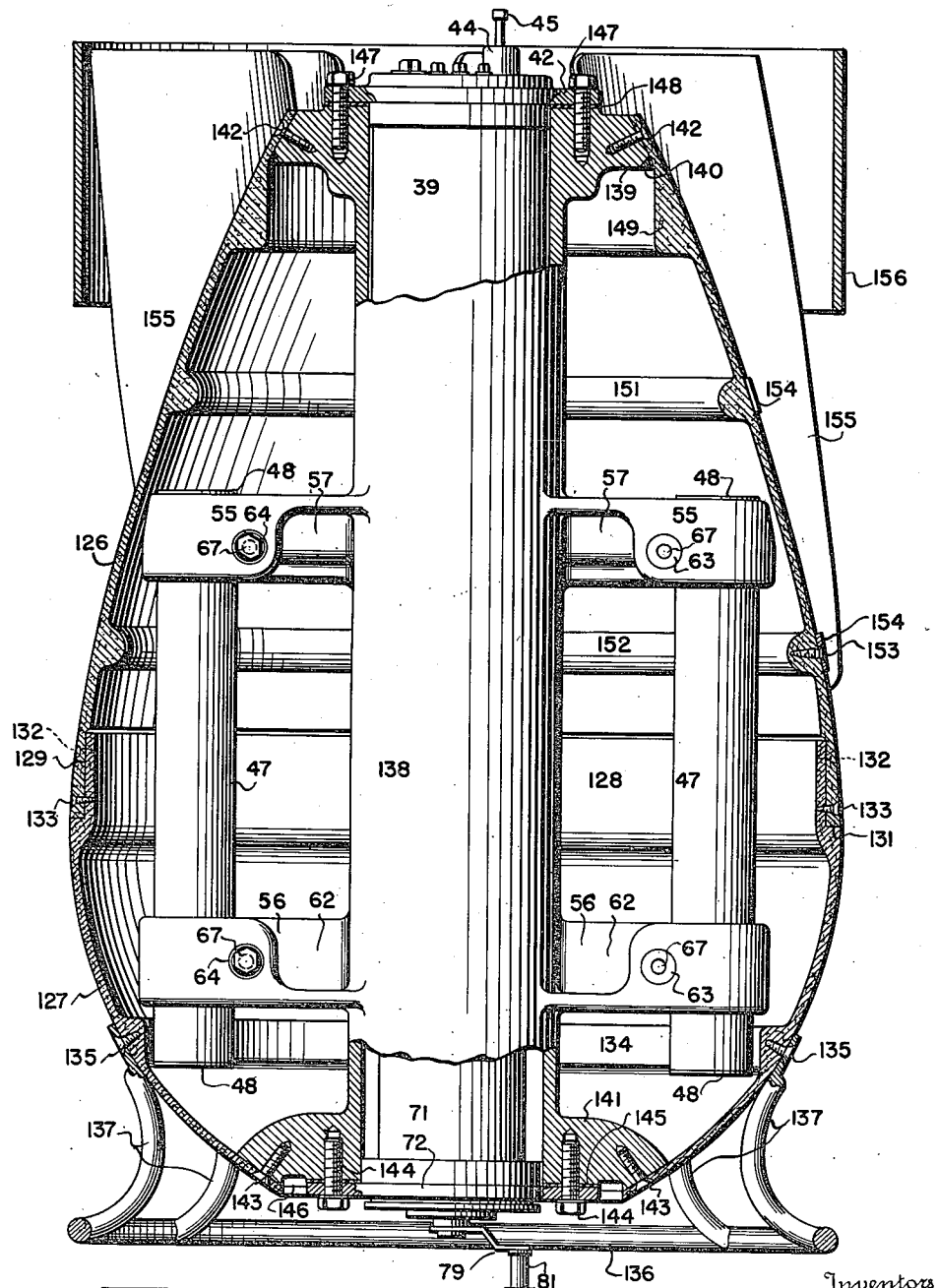

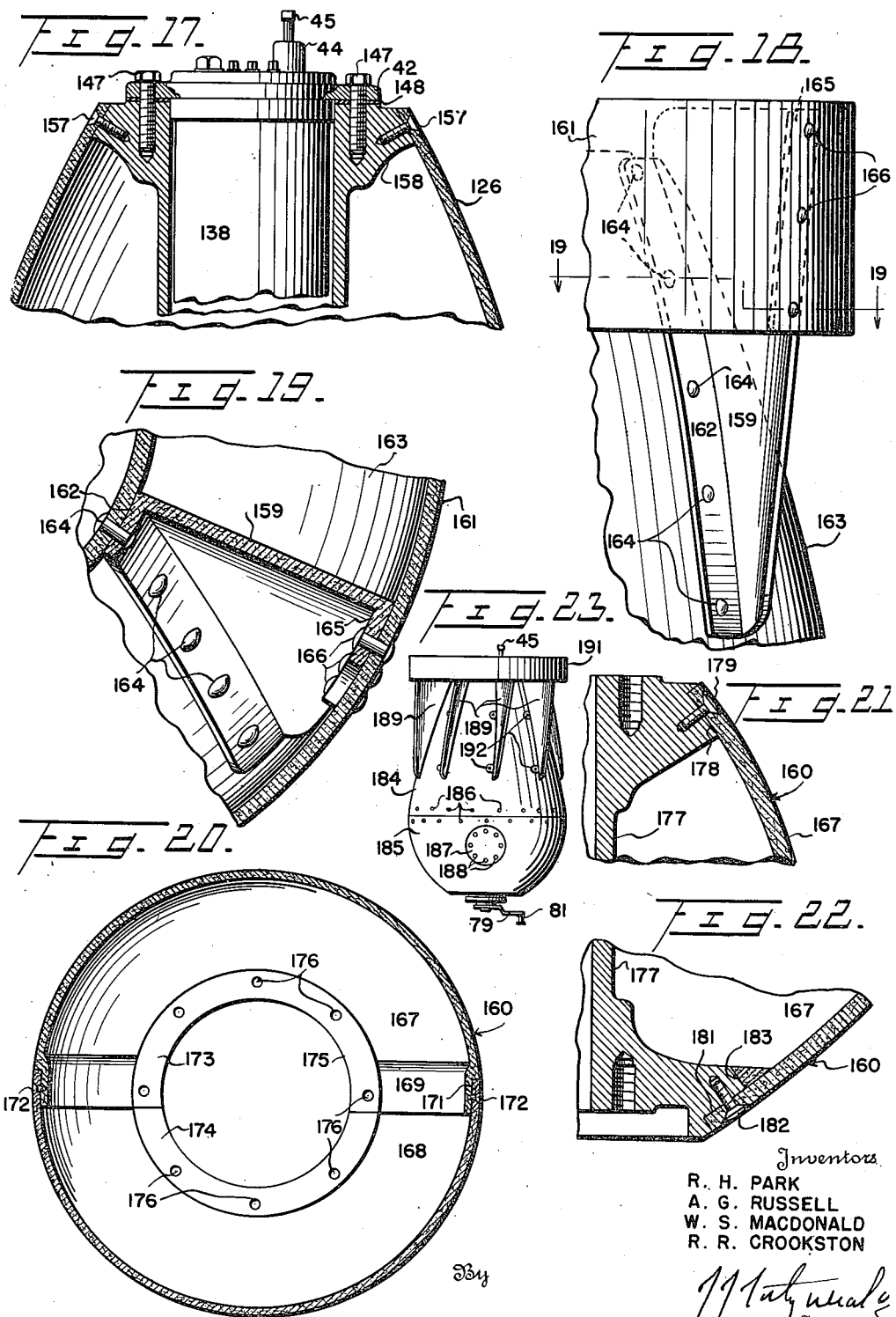

Patented June 10, 1952

2,599,579

UNITED STATES PATENT OFFICE 2,599,579

STREAMLINE DEPTH CHARGE

Robert H. Park, Pluckemin, N. J., Arthur G. Russell, Arlington, Va., Waldron S. Macdonald, Westgate, Md., and Robert R. Crookston, Washington, D. C.

Application February 1, 1943, Serial No. 474,346

13 Claims. (Cl. 102—7)

(Granted under the act of March 3, 1883, as amended April 30, 1928; 370 O. G. 757)

This invention relates to an improved depth charge adapted to be launched within a body of water from an attacking craft in which the firing of the depth charge is controlled by the gradient of the magnetic field of a submarine and in which means are provided for preventing the flow of eddy currents induced within the casing of the depth charge sufficient to influence the gradient detecting mechanism. More specifically, the invention relates to a depth charge of new and improved design having a casing composed of nonmetallic material suitable for the purpose adapted to be rolled along a track or rail arranged on the vessel from which the depth charge is released, or adapted to be fired from a gun, as the case may be, in which the depth charge quickly assumes a vertical position within the water after being launched and sinks within the water along a predetermined path of travel at a relatively high rate of speed without substantial deviation from the line of travel, the depth charge having a rotative movement imparted concurrently thereto by an impeller secured to or formed integrally with the casing of the depth charge.

In depth charge devices of the types now in general use, the casing is generally cylindrical in shape and caused to be moved downward through the water endwise by reason of the provision of a relatively heavy mass arranged within the cylindrical casing at the lower end thereof thereby to cause the center of gravity of the depth charge to be disposed near the weighted end of the depth charge. This type of depth charge possesses the disadvantage of relatively slow movement through the water by reason of the cylindrical shape and squared ends of the casing and, furthermore, the axis of the cylindrical type depth charge has been found to deviate to a considerable extent from the path of travel of the depth charge as the result of wobble of the depth charge within the water presumably caused by the vortical condition of the water adjacent thereto as the depth charge sinks within the water. The rate of travel of the cylindrical type depth charge within the water is additionally retarded by this wobbling motion. The rate of travel of the depth charge within the water has been found to be increased by forming the casing along approved hydrodynamic lines and providing the depth charge with a plurality of fins or flight members secured to the trailing portion of the depth charge casing having a cylindrical sleeve or collar secured thereto whereby the the wobble of the depth charge within the water is obviated and the rate of movement of the depth charge through the water is correspondingly increased. There is also secured to the leading end of the depth charge as by a plurality of supports a non-magnetic metal ring of the same outside diameter as the aforesaid cylindrical sleeve thereby to provide a structure in which the depth charge may be rolled along the deck of a vessel or along a launching rack, as the case may be. The cylindrical collar and metal ring are preferably of the same diameter as the maximum diameter of the depth charge casing thereby providing a structure in which the blow or impulse of pressure received by the depth charge as the result of bumping or striking an adjacent depth charge on the runway or deck of the vessel, as the case may be, is provided between the annular collar, the aforesaid metal ring, and the central portion of the casing in such a manner as to prevent damage to the depth charge as the result of collision with an adjacent depth charge or flat surface with which the depth charge may collide. The outer appearance and general shape of the depth charge casing of the present invention is generally similar to the depth charge disclosed and claimed in the copending application of Robert H. Park et al. for Streamline Depth Charge, Serial No. 456,048, filed August 25, 1942.

In the device of the present invention the depth charge casing is composed of non-metallic material suitable for the purpose such, for example, as a plastic material preferably formed by low pressure molding processes although it will be understood that, if desired, the casing may be formed by any of the high pressure molding methods well known in the art. More specifically, the casing may be composed of layers of plywood which are molded into the desired shape, or the case may be composed of any of the commercial varieties of plastic materials employed with low pressure molding processes such, for example, as a material composed of canvas impregnated with a binder suitable for the purpose such, for example, as urea-formaldehyde.

The mine firing mechanism and the depth controlled arming mechanism are arranged within a centrally disposed cylindrical or tubular member composed of suitable non-magnetic material such, for example, as plastic or aluminum. The cylindrical member is provided with two pairs of arms projecting radially outward therefrom and adapted to support a pair of gradiometer coils diametrically arranged on opposite sides of the cylindrical member in predetermined balanced space relation with respect to each other whereby the gradiometer coils are rotated at equal distances from an axis of rotation by the aforesaid impeller as the depth charge sinks within the water. The gradiometer coils are opposedly connected together in series whereby the signals generated by each of the coils are exactly balanced as the depth charge moves within a uniform magnetic field and an electrical signal, hereinafter referred to as a gradient signal is generated by the gradiometer coils as the coils are moved through a non-uniform magnetic field.

As is well known in the electrical art, the movement of an electroconductive body within a magnetic field causes electrical or eddy currents to be set up in the conducting body. In the case of a depth charge in which an electroconductive casing is employed, rotative or angular movement of the depth charge within the terrestrial magnetic field causes electrical currents to flow within the casing along certain paths controlled by the conductivity of the material of which the casing is composed, the arrangement and type of joints employed in the casing, the configuration of the casing and the direction and degree of movement of the casing within the magnetic field. These induced currents set up a magnetic field having an axis not in coincidence with the axis of rotation of the gradiometer coils and the balance of the gradiometer coils is disturbed sufficiently thereby to cause an output signal to be generated by the gradiometer coils as the depth charge moves within a uniform magnetic field.

It has been found that this condition of unbalance of the gradiometer coils may be reduced by arranging the gradiometer coils in a particular position with respect to the conductive casing of the depth charge. In accordance with the provisions of the present invention, however, the casing of the depth charge is composed of non-conductive material and eddy currents, therefore, are thus prevented from flowing through the casing as the depth charge sinks within the water. Furthermore, by providing a depth charge casing of non-conductive material the gradiometer coils may be maintained in a balanced condition during the movement of the depth charge within the water regardless of the longitudinal setting of the gradiometer coils with respect to the casing of the depth charge. The lack of response of the gradiometer coils to the positional disposition of the coils with respect to the casing of the depth charge facilitates the arrangement of the coils within the casing wherein the size of the casing employed with depth charges adapted to be launched from the launching tracks of vessels now in general use prevents a considerable longitudinal adjustment of the gradiometer coils within the casing.

One of the objects of the present invention is the provision of a new and improved depth charge in which electrical or eddy currents are prevented from flowing within the casing of the depth charge during the travel of the depth charge through the water.

Another of the objects is the provision of a new and improved depth charge casing composed of two complementary sections and means for detachably securing the sections together.

Another of the objects is a new and improved depth charge having a casing composed of non-metallic material adapted to support and enclose an explosive charge and having means for continuously rotating and directing the depth charge along a predetermined line of flight without deviation of the axis thereof from the line of flight.

Another object is the provision of a depth charge of new and improved design comprising a separable non-metallic casing and means for securing an end ring and an impeller on the lower and upper portions of the casing respectively.

Still another object is the provision of a separable depth charge casing of non-electroconductive material adapted to support a firing mechanism controlled by a pair of gradiometer coils arranged within the casing in predetermined balanced space relation with respect to the axis of the casing.

A still further object is the provision of a new and improved depth charge structure comprising a separable casing of non-magnetic material adapted to move rotatably and axially within the water with the axis thereof in coincidence with the line of flight of the depth charge, in the novel arrangement of the parts and instrumentalities thereof and the structure wherein the various parts and instrumentalities are maintained in a predetermined assembled position with respect to each other at all times during the handling, transportation and planting of the depth charge.

Still other objects, advantages and improvements will become apparent from the following description taken in connection with the accompanying drawings of which:

Fig. 6 is an enlarged fragmentary sectional view taken along the line 6—6 of Fig. 1;

Fig. 7 is an enlarged fragmentary sectional view of the end ring and the associated parts therefor taken substantially along the line 7—7 of Fig. 1;

Fig. 8 is a view in elevation partly in section showing an alternative form of the invention;

Fig. 9 is an enlarged fragmentary sectional view taken along the line 9—9 of Fig. 8;

Fig. 10 is an enlarged fragmentary sectional view taken along the line 10—10 of Fig. 8;

Fig. 11 is a fragmentary view showing the means for securing the end ring to the casing of the depth charge;

Fig. 12 is an enlarged fragmentary sectional view, taken along the line 12—12 of Fig. 8;

Fig. 13 is an enlarged fragmentary view taken along the line 13—13 of Fig. 8;

Fig. 14 is a detailed sectional view of an alternative form of filler cap suitable for use with the present invention;

Fig. 15 is a detailed sectional view showing an alternative arrangement for securing the shroud to the fins of the depth charge;

Fig. 16 is a vertical sectional view showing another alternative form of the invention;

Fig. 17 is a fragmentary view in section of the upper portion of the depth charge showing an alternative construction of the central tubular member and casing and the securing means therefor;

Fig. 18 is a fragmentary view showing a further modification of the shroud and fins and securing means therefor;

Fig. 19 is a fragmentary sectional view taken along the line 19—19 of Fig. 18;

Fig. 20 is a view in section taken transversely through the depth charge showing a casing comprising a pair of separable longitudinal sections and the securing means therefor.

Figs. 21 and 22 show a method of joining the casing of the depth charge of Fig. 20 to the upper and lower ends of the central tubular member therein respectively; and, Fig. 23 shows a further modification of the depth charge.

Figure 1:
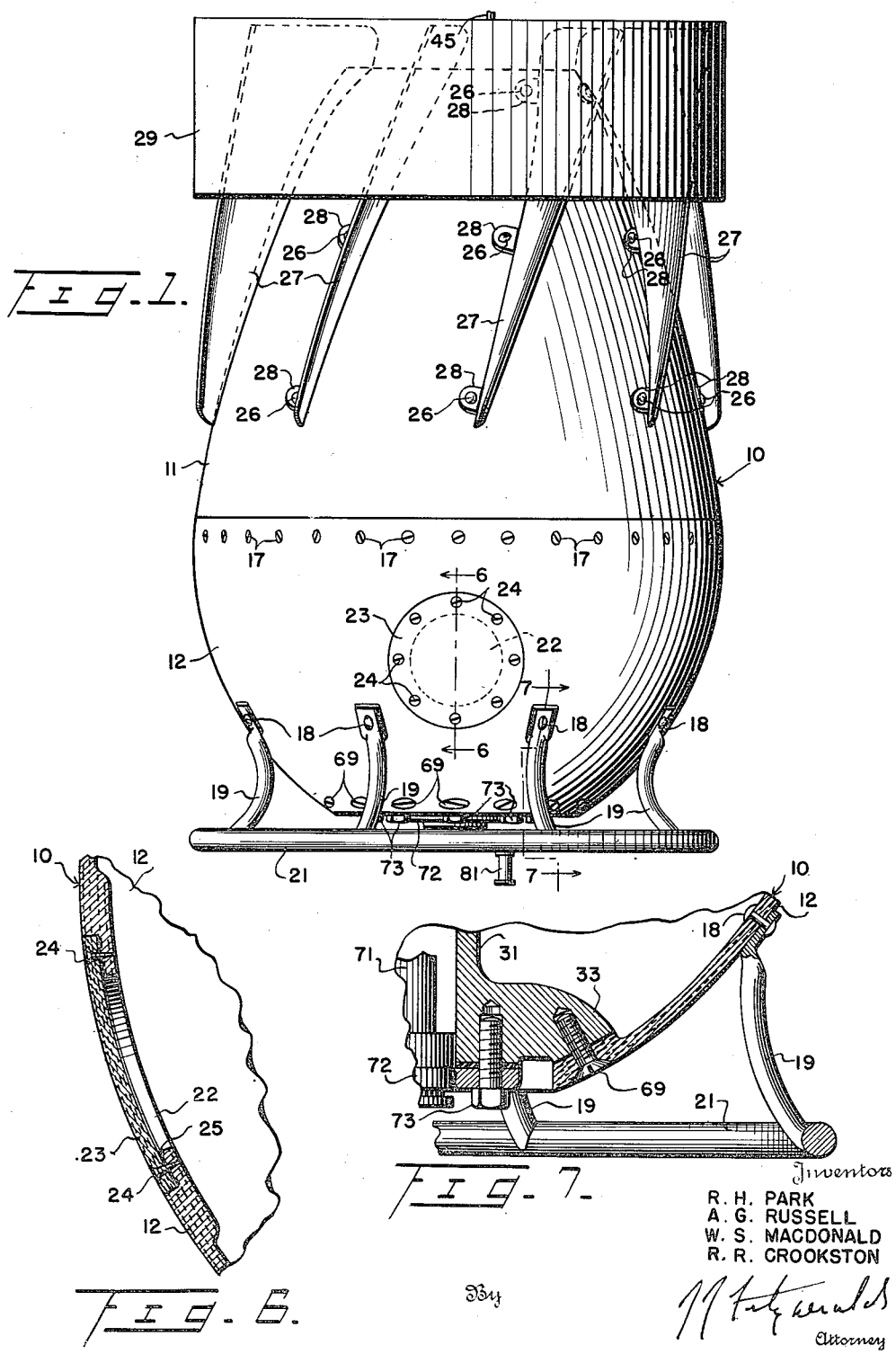
Fig. 1 is a view in elevation of a depth charge in accordance with the present invention.
Figure 2:
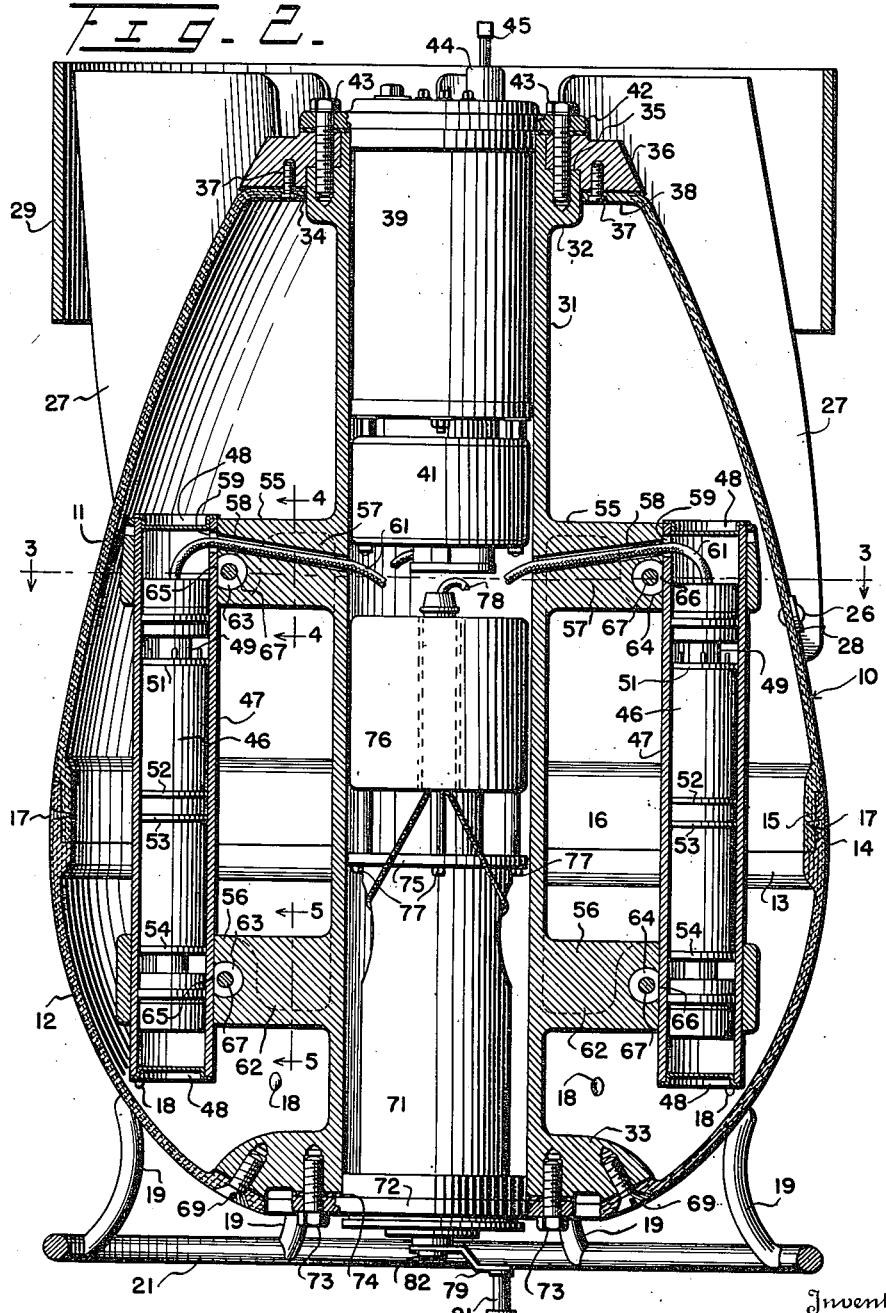
Fig. 2 is a central vertical sectional view somewhat enlarged of the depth charge of Fig. 1.

Referring now to the drawings on which like numerals of reference are employed to designate like parts throughout the several views and more particularly to Figs. 1 and 2 thereof there is shown thereon a depth charge in accordance with the present invention indicated generally by the numeral 10 having a casing comprising upper and lower portions or sections 11 and 12 respectively composed of non-electroconductive material suitable for the purpose such, for example, as a material composed of laminated canvas with an impregnation of urea-formaldehyde or a nonconductive material having the desired qualities generally similar to the aforesaid laminated canvas in which the nonconductive property of the material prevents the flow of electrical or eddy currents therein as the mine moves through a magnetic field. The lower portion 12 is provided with an inner annular raised portion 13 formed as at 14 to receive a complementary portion 15 of the upper section of the casing, the section 15 being formed within an annular raised portion 16 arranged within the interior of the upper section 11 of the depth charge casing and of sufficient thickness to be engaged by the screws 17 whereby the upper and lower portions of the casing are adapted to be clamped or secured together by the aforesaid screws, a binding substance or other suitable adhesive preferably having first been applied to the parts to insure a watertight connection therebetween. The outer surfaces of the upper and lower portions of the casing are adapted to be brought into matching relation with each other as the parts are assembled whereby the casing of the depth charge has a continuous unbroken appearance when the parts are in the assembled position shown on the drawings.

The lower portion 12 of the casing has affixed thereto as by the rivets 18 and supporting arms 19 an end member or ring 21 of non-magnetic material such, for example, as aluminum or manganese steel of substantially the same diameter as the maximum diameter of the depth charge casing, adapted to be employed as a traction element in engagement with one of the rails of the launching track of the vessel during the launching of the depth charge therefrom.

There is also provided within the lower portion 12 of the casing an aperture 22 preferably circular in shape adapted to be enclosed by a filler cap or cover 23 secured to the depth charge casing as by the screws 24, a suitable gasket 25 being employed between the filler cap and the casing to prevent the leakage or seepage of water therebetween.

The upper portion 11 of the casing has secured thereto in any suitable manner as by the rivets 26 a plurality of fin members 27, the fin members being secured thereto at an angle thereby to provide an impeller arrangement adapted to impart a rotary motion to the depth charge as the depth charge sinks within the water, each of the fins having a plurality of bent over portions or tabs 28 adapted to be engaged by the rivets. The fin members 27 are composed of non-magnetic material suitable for the purpose such, for example, as manganese steel, aluminum or brass and provided with an annular member or shroud 29 secured thereto in any suitable manner as by welding or brazing the parts together, the annular member also preferably being composed of the same material as the fin members. An arrangement is thus provided in which the depth charge is adapted to roll along the deck of the vessel or along the launching rack of the vessel by engagement of the deck or launching rack with the outer surfaces of the annular members 21 and 29 and in which the annular member 29 is also employed to direct the line of flight of the depth charge through the water without deviation of the axis of the depth charge from the line of flight as the depth charge is rotated by the aforesaid impeller.

There is also arranged within the casing of the depth charge a tubular member 31 having flanged portions 32 and 33 projecting outwardly from the upper and lower end portions of the member respectively. The flange 32 is adapted to be disposed within a centrally arranged aperture 34 within the upper portion of the depth charge casing and provided with a shoulder 35 adapted to coact with a complementary shoulder within a circular collar or plate 36 to which the end portion of the depth charge casing 11 is secured as by the screws 37, the end portion of the casing being formed inwardly as at 38 to provide a surface against which the collar is clamped. This surface may, if desired, be coated with a binder or a suitable gasket may be employed to insure a watertight connection between the casing 11 and the plate 36. There is also provided within the upper portion of the tubular member 31 a firing control mechanism 39 having a battery 41 operatively connected thereto, the firing mechanism including a flange portion 42 having a plurality of apertures circumferentially arranged therein within which are disposed the bolts 43 threaded into the upper flange portion 32 of the tubular member 31.

The firing control mechanism 39 may be of any type suitable for the purpose in which a firing circuit is adapted to be closed in response to the gradient of the magnetic field within which the depth charge moves such, for example, as the Firing Control Mechanism for a Depth Charge disclosed in the copending application of Waldron S. Macdonald et al., Serial No. 453,550, filed August 4, 1942 in which the gradient signal detected by a pair of balanced gradiometer coils is employed to control a signal amplifying mechanism thereby to operate an electro-responsive device connected to the output of the signal amplifying mechanism and fire the depth charge when the gradient signal has reached a predetermined order of magnitude. The firing control mechanism preferably includes a plug 44 having a recessed portion therein adapted to be sealed by the projecting pin 45 soldered thereto whereby the pin is adapted to be disengaged from the plug by striking against a portion of the launching mechanism or by the pull of an arming wire connected thereto as the depth charge is launched thereby permitting the flow of water into a chamber arranged within the control mechanism and causing a hydrostat device to be operated by the pressure of the water and initiate a cycle of operations whereby the signal amplifying mechanism is rendered effective to close the aforesaid firing circuit in response to a predetermined gradient in the magnetic field adjacent the depth charge.

Figure 4:
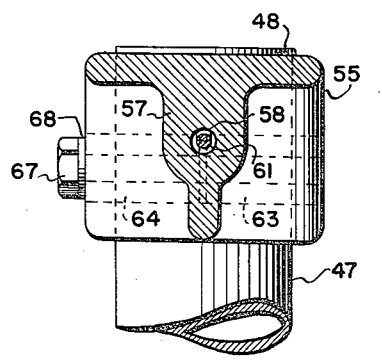
Fig. 4 is an enlarged detailed sectional view taken along the line 4—4 of Fig. 2.

The signals employed for controlling the signal amplifying mechanism are received from a pair of gradiometer coils 46 respectively arranged within the tubular members 47 having caps 48 in the ends thereof to protect the coils from injury as the depth charge casing is filled with an explosive charge. The gradiometer coils are preferably of the type disclosed in the aforesaid application of Waldron S. Macdonald et al., Serial No. 453,550, filed August 4, 1942 comprising a plurality of turns of relatively fine wire disposed about a core 49 of magnetic material suitable for the purpose such, for example, as a material known in the trade as 4-79 Permalloy having a composition of substantially 79 percent nickel, 4 percent molybdenum and 17 percent iron. The coils 46 are maintained in predetermined space relation with respect to each other by reason of the provision of the washers or spool heads 51, 52, 53 and 54 of suitable insulating material adapted to fit slidably within the tubular member 47. The tubular members 47 are rigidly supported by the arms 55 and 56 projecting outwardly on opposite sides of the tubular member 31 and preferably formed integrally therewith, the arms 55 each comprising a ribbed portion 57, Figs. 2 and 4, having an aperture 58 therein adapted to be alined with an aperture 59 arranged within the upper portion of each of the tubular members 47 thereby forming a duct within which the cables 61 are arranged. Each of the cables 61 is provided with a plurality of electrical conductors adapted to establish an external electrical connection to the coils 46.

Figure 3:
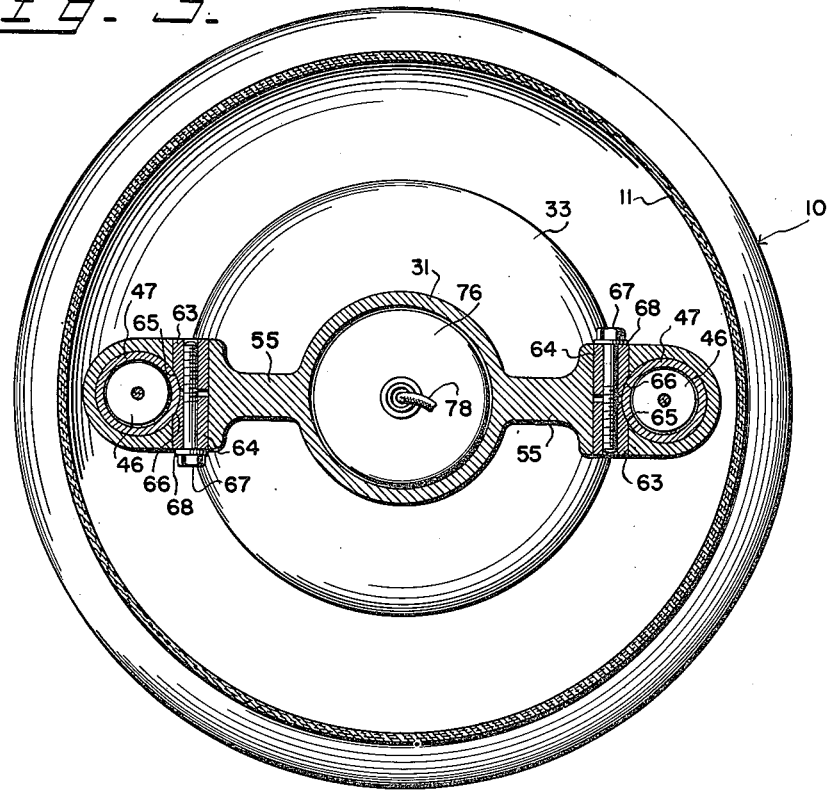
Fig. 3 is a sectional view taken along the line 3—3 of Fig. 2.
Figure 5:
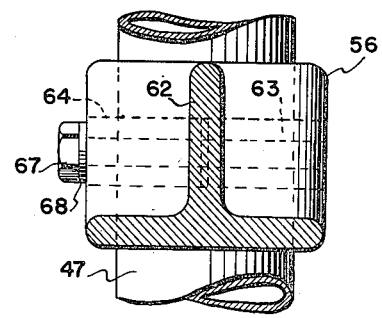
Fig. 5 is an enlarged detailed sectional view taken along the line 5—5 of Fig. 2.

Each of the lower arms 56 is provided with a ribbed portion 62, Figs. 2 and 5, the ribbed portions of the arms 55 and 56 being of sufficient size to insure exact alinement of the coils within the tubular members 47 at all times during the filling of the depth charge casing with an explosive and during the handling, transportation and launching of the depth charge. The tubular members 47 are securely clamped to the arms 55 and 56 by the cylindrical clamping members 63 and 64, Figs. 2 and 3, having arcuate portions as at 65 and 66 respectively adapted to engage the tubular members 47 as the clamping members are drawn together by the bolt 67 threaded within the clamping member 63, a suitable washer 68 being provided preferably between the head of the bolt and the member 64. While on Fig. 3 is shown a clamping arrangement comprising two movable tubular members 63 and 64 adapted to be drawn together by the bolt 67, it will be understood that other clamping arrangements may, if desired, be employed such, for example, as an arrangement in which the clamping member 63 is formed integrally with the arm 55 or 56, as the case may be, and the clamping member 64 only is adapted to be moved by the bolt 67 into clamping relation with the tubular member 47.

The lower flange portion 33 of the tubular member 31 is secured to the lower portion 12 of the casing of the depth charge as by the screws 69. The joint between the flange 33 and the casing 12 may be rendered watertight by employing a suitable binder or gasket therebetween.

There is also provided within the cylindrical member 31 a casing 71 comprising a flanged member 72 secured to the cylindrical member 32 at the flanged portion 33 thereof as by the bolts 73, a gasket 74 preferably being arranged between the flanged member 72 and the flanged portion of the tubular member to prevent the leakage or seepage of water therebetween. The casing 71 is provided with a collar or plate 75 to which is secured the casing 76 having an explosive charge therein, the bolts 77 being employed to maintain the casing in the assembled position shown on Fig. 2 of the drawings. A detonating device arranged within the casing 71 is in electrical connection with the firing control mechanism 39 as by the conductors within the cable 78 whereby the detonating device is adapted to be fired in response to a signal received from the firing control mechanism 39 when the gradient of the magnetic field detected by the gradient pickup coils 46 has reached a predetermined strength. The aforesaid detonating device is preferably of the type adapted to be brought into operative relation with respect to an explosive charge arranged within the casing 76 in response to the operation of a hydrostat device, as is well known in the art to which the present invention pertains, the premature operation of the hydrostat device being prevented by a detachable fork member 79 having a projecting portion 81 adapted to be brought into engagement with one of the obstruction devices on the launching apparatus employed with the depth charge thereby to cause the fork member 79 to be disengaged from the plunger 82 of the hydrostat mechanism with which the fork is normally engaged. In the event that the depth charge is launched from a Y gun, the fork member 79 may be disengaged from the plunger 82 of the hydrostat mechanism manually or by means of an arming wire secured to the projecting portion 81 thereof. When this occurs, the plunger 82 is unlocked and the hydrostat device is thereby adapted to respond to the pressure of the water within which the depth charge is immersed, the member 79 effectively preventing movement of the hydrostat device and the detonating device connected thereto prior to the launching of the depth charge.

Whereas in the embodiment of the invention shown on Fig. 2 of the drawings a particular form of structure of the depth charge exploding mechanism is employed, it will be understood that this is by way of illustration only and that various other forms of explosive chambers and detonating devices therefor adapted to be brought into operative relation with an explosive charge in response to the pressure of the water within which the device is launched may be employed without departing from the spirit and scope of the present invention and the specific form of the explosive device and hydrostatically controlled means for inserting the detonating element within the explosive charge form no part of the present invention.

Also, if desired, the detonating device may be of the type adapted to explode a percussion cap when the pressure of the water against the hydrostat element operatively connected thereto has been increased to a predetermined order of magnitude in the event that the path of travel of the depth charge within the water is not sufficiently near the submarine to cause the depth charge to be exploded by gradient signals received by the gradiometer pickup coils 46. It will also be understood that in any of the well known devices suitable for the purpose in which the depth of submersion at which the percussion cap is exploded by the hydrostat device may be set at will, means may be provided for adjusting the depth at which the percussion cap is exploded by the depth adjusting means, and such depth adjusting means forms no part of the present invention.

On Fig. 8 is shown an alternative form of depth charge in accordance with the present invention in which the depth charge casing is composed of layers of plywood molded into the desired shape, the casing comprising an upper portion 83 and a lower portion 84 and having a reinforced annular strip 85 secured thereto interiorly as by a plurality of screws 86, the annular strip 85 being adapted to receive a plurality of screws 87 whereby the upper and lower portions of the casing are adapted to be secured together, a binder or other sealing material suitable for the purpose being preferably applied between the annular strip 85 and the interior of the casing of the depth charge and also, if desired, between the adjacent edges of the upper and lower portions 83 and 84 of the casing thereby additionally to secure the parts in the assembled position with respect to each other and prevent the seepage or leakage of water therebetween. The annular member 85 may be composed of any suitable non-electroconductive material but we prefer to employ for this purpose an annular member composed of wood which may be bent in a circular form and secured together at the ends thereof in any suitable manner to form a continuous ring of suitable size such that the ring may be fitted snugly within the depth charge casing in the manner illustrated.

The casing and annular member 85 are preferably given a protective coating or finished in such a manner as to render the casing practically impervious to the effects of water and thus there is no possibility of the depth charge casing becoming warped or otherwise deformed as the result of moisture absorbed by the material of which the casing is composed. When the portions 83 and 84 are assembled together, the outer surfaces of each of the portions are brought into matching relation with each other whereby the depth charge has a continuous unbroken appearance and thus a minimum of resistance to the passage of the depth charge through the water is effected. The lower portion 84 of the casing has formed therein a plurality of raised portions or bosses 88 adapted to receive a plurality of screws 89 having nuts 91 and suitalbe washers thereon adapted to clamp to the lower portion of the casing the annular member 92 by means of a plurality of arms 93 secured thereto, the member 92 and arms being composed of non-magnetic metal suitable for the purpose such, for example, as aluminum, brass or the like.

Secured to the lower portion 84 of the depth charge casing as by the screws 94 is a tubular member 95 generally similar to the aforesaid tubular member 13 of Fig. 2 and provided with flanged portions 96 and 97 at the upper and lower ends thereof adapted to be secured to the upper and lower portions of the depth charge casing respectively, the upper portion being secured as by the screws 98. If desired, a binder or other adhesive suitable for the purpose may be applied between the flanged portions 96 and 97 of the tubular member 95 and the depth charge casing to insure a watertight connection between the flanged portions and the casing of the depth charge. The lower portion 84 of the depth charge casing is provided with an aperture 99 adapted to receive the hydrostatically controlled firing mechanism comprising the casing 71 and a flanged member 72 thereon, the firing mechanism being secured to the lower portion of the tubular member 95 as by the bolts 101, a gasket 102 being preferably provided to prevent the leakage or seepage of water therebetween.

The aforesaid firing control mechanism 39 is adapted to be assembled within the upper portion of the tubular member 95 as by the bolts 102, a suitable gasket 103 being assembled between the flanged portion 42 of the firing mechanism and the upper end of the tubular member 95.

There is provided within the upper portion 83 of the mine casing an aperture 104, preferably circular in shape, of sufficient size to enable the explosive charge to be introduced within the depth charge casing adapted to be sealed by the filler cap 105 of suitable material such, for example, as the material of which the depth charge casing is composed. The casing is maintained in the assembled position by a plurality of screws 106 adapted to engage an annular member or boss 107 secured to or formed integrally with the upper portion 83 of the depth charge casing, a suitable gasket 108 being provided preferably between the filler cap and the member 107 to insure a watertight joint therebetween. The filler cap 105 is preferably formed arcuately to conform with the outer contour of the depth charge casing.

There is also secured to the upper portion 83 of the depth charge casing a plurality of fin members 109 composed preferably of wood and arranged at an angle with respect to the line of flight of the depth charge through the water thereby providing an impeller arrangement adapted to impart a rotative movement to the depth charge as the depth charge sinks within the water. The fins may be secured to the upper portion 83 of the casing in any suitable manner as by a binder, a pair of fillets 111 and 112, Figs. 8 and 12, being secured as by a suitable binder to each of the fins 109 and to the upper portion 83 of the casing. The upper end of each of the fins 109 is brought into engagement with and secured to the inner surface of a cylindrical member or shroud 113 as by a binder, a pair of fillets 114 and 115, Fig. 13, being secured to the fins and to the cylindrical member thereby additionally to brace and support the fins and cylindrical member in the assembled position. The shroud 113 and aforesaid fillets are also preferably composed of wood and provided with a suitable protective coating or finish adapted to protect the wood from the effects of moisture and the like. On Fig. 15 is shown an alternative arrangement for securing the cylindrical member 113 to the fins 109, the cylindrical member being recessed as at 116 sufficiently to receive and support the edge of the fins. The fins are secured to the cylindrical member in any suitable manner as by a binder suitable for the purpose.

The cylindrical member 95 is provided with a plurality of projecting arms 55 and 56 adapted to support the gradiometer pickup coils arranged within the tubular members 47 in predetermined balanced space relation.

On Fig. 14 is shown an alternative form of filler cap indicated generally by the numeral 117 for use with the depth charge of the present invention. The filler cap is provided with a cylindrical portion 118 adapted to fit slidably within an aperture 119 within the casing 121, the casing 121 having a flat portion 122 adapted to be engaged by the complementary flanged portion 123 of the filler cap. If desired, a suitable gasket 124 may be arranged between the portions 122 and 123 to insure a watertight connection therebetween as the filler cap is clamped to the casing 121 as by the screws 125. The filler cap is formed at the outer surface thereof convexly to conform with the outer contour of the casing 121.

On Fig. 16 is shown partly in section and partly in elevation an alternative form of depth charge in accordance with the present invention in which the casing is composed of plastic material suitable for the purpose and formed by a low pressure molding process, or a high pressure molding process, as the case may be, having an upper section 126 and a lower section 127 adapted to be joined together to form a depth charge casing of unbroken contour substantially as shown in Fig. 16. The lower portion 127 is provided with a reinforced section 128 somewhat less in diameter than the maximum diameter of the depth charge casing and having a cylindrical portion 129 formed therewith adapted to engage and support a complementary cylindrical portion formed within the upper casing 126. With the upper and lower casings assembled in the position shown on Fig. 16, the lower edge of the casing 126 is in engagement with a shoulder 131 formed on the lower portion 127 of the casing, the upper and lower portions of the casing being secured together by a plurality of screws 132 and 133 and, if desired, a binder of any suitable material may be applied to the complementary cylindrical portions of the casings and between the lower edge of the casing 126 and the shoulder 131. Also, if desired, by employing a suitable binder, the screws 132 and 133 may be omitted from the structure.

The lower portion 127 is provided with a reinforced annular member 134 preferably formed integrally therewith adapted to receive a plurality of screws 135 thereby to secure the nonmagnetic annular member 136 to the depth charge casing at the upper ends of the arms 137 extending upwardly from the annular member. A cylindrical member 138 of nonmagnetic material generally similar to the cylindrical member 31 is provided with flanged portions 139 and 141 at the upper and lower ends thereof adapted to be engaged by the upper and lower portions 126 and 127 respectively of the depth charge casing. The upper portion 126 is secured to the flange portion 139 as by the screws 142 and the lower flanged portion 141 is secured to the lower portion 127 of the casing as by the screws 143, a suitable binder being employed preferably between the depth charge casing and the portions 139 and 141 to effect a watertight connection therebetween and additionally to secure the cylindrical member 138 to the casing of the depth charge. The lower portion of the flange 139 may, if desired, be beveled or chamfered thereby to form a recessed portion 140 adapted to be filled with a suitable binder. The hydrostatically controlled firing mechanism including the chamber 71 and the flanged portion 72 thereof is secured to the lower end of the cylindrical member 138 as by the bolts 144, a suitable gasket 145 being employed to insure a watertight joint therebetween. The lower end of the casing 127 is provided with an aperture 146 of sufficient size to allow the hydrostatically controlled firing mechanism to be inserted in the assembled position within the cylindrical member 138. The member 138 is provided with arms 55 and 56 adapted to support the gradiometer pickup coils within the tubular members 47 and prevent movement of the coils relative thereto by reason of the provision of the clamping members and bolts heretofore described.

The firing control mechanism 39 including the flanged portion 42 thereof is secured to the upper end of the cylindrical member 138 as by the bolts 147, a suitable gasket 148 being provided between the flanged portion 147 and the upper end of the cylindrical member to effect a watertight joint therebetween. There is also provided within the upper portion 126 of the depth charge casing a plurality of annular reinforcing members 149, 151 and 152 preferably formed integrally with the depth charge casing thereby to strengthen and support the casing and receive a plurality of screws 153 arranged within bent over portions or tabs 154 formed on the fins 155. The fins are composed of a material suitable for the purpose such, for example, as manganese steel having a shroud or cylindrical member 156 secured thereto in any suitable manner such, for example, as by welding the parts together, the arrangement of fins and shroud being generally similar to the impeller employed with the depth charge of Fig. 1.

On Fig. 17 is shown an alternative form of construction of the upper end of the tubular member 138 and casing 126 secured thereto as by the screws 157 in which the upper reinforced portion 149 of the casing is not required. Preferably, though not necessarily, the casing 126 is additionally secured to the upper flanged portion 158 of the tubular member by a binder composed of adhesive material suitable for the purpose applied therebetween before the screws 157 are threaded into the flanged portion 158.

On Figs. 18 and 19 is shown a modified form of the fin and shroud structure suitable for use with the depth charge of the present invention in which the fins and shroud are designated by the numerals 159 and 161 respectively and are composed of plastic material suitable for the purpose, the fins 159 having a portion 162 formed thereon of arcuate shape adapted to be secured to the casing 163 of the depth charge as by a plurality of rivets 164. The outer end of the fin is arcuately formed as at 165 and adapted to be secured to the shroud 161 as by the rivets 166.

On Fig. 20 is shown a sectional view taken transversely through the casing indicated generally by the numeral 160 of the depth charge in which the casing is composed of a pair of separable longitudinal sections 167 and 168. The section 167 has a reinforced portion 169 therein recessed as at 171 to receive the inner portion of the section 168, a plurality of screws 172 being provided to maintain the longitudinal sections secured to each other. It will be understood that, if desired, a suitable gasket or binder suitable for the purpose may be applied between the sections 167 and 168 at the recessed portion 171 to insure a watertight joint therebetween. The sections 167 and 168 are each provided with two semi-circular flanged portions 173 and 174 respectively adapted to form an aperture 175 on opposite ends of the depth charge casing when the sections are assembled together. The semi-circular flanged portions 173 and 174 are adapted to be clamped on opposite ends of a cylindrical supporting member by suitable bolts arranged within the apertures 175, suitable gaskets preferably being provided to maintain a watertight connection therebetween.

On Figs. 21 and 22 is shown an alternative structure suitable for securing the depth charge casing of Fig. 20 to the upper and lower ends of the central supporting tubular member 177. The upper end of the member 177 is provided with an outwardly projecting flange having a surface 178 adapted to be engaged by the casing 160 of the depth charge and clamped thereto as by the screws 179. If desired, a suitable binder may be employed to insure a watertight joint between the member 177 and the casing.

On Fig. 22 the casing 160 of the depth charge is clamped to the lower flanged portion of the supporting tube 177 at the surface 181 thereof as by the screws 182, a suitable binder being preferably arranged between the surface 181 including the chamfered portion 183 of the tubular member 177 and the depth charge casing.

On Fig. 23 is shown an improved depth charge comprising a casing having upper and lower portions 184 and 185 respectively composed of nonmetallic material adapted to be secured together as by the screws 186. A filler plug 187 is also provided to seal an aperture within the casing after the explosive charge has been introduced therein, the filler plug being secured to the casing as by the screws 188. A plurality of fins 189 having a shroud 191 secured thereto is attached to the upper casing 184 of the depth charge as by the screws 192, the arrangement comprising an impeller adapted to rotate the depth charge as the depth charge sinks within the water. The depth charge casing is composed of any non-electroconductive material suitable for the purpose, and the impeller may, if desired, be composed of nonmagnetic material such, for example, as wood, laminated canvas, or manganese steel. In the embodiment of the invention shown on Fig. 23 a lower outwardly extending ring is not provided and the depth charge, therefore, is launched preferably from a Y gun or by other suitable means in which the traction members secured to the depth charge casing are not required.

It has been found desirable during the assembly of the depth charge to provide a casing comprising two separable sections adapted to be transported in a partially assembled condition from the place where the depth charge casing is fabricated to the location where the central tubular member assembly and gradiometer coils are assembled within the casing. More specifically, it has been found advantageous to assemble the two sections of the depth charge casing together at the place where the depth charge casing is fabricated before shipping the casing to the final assembly plant thereby to insure that the two portions of the casing may be perfectly matched when the depth charge is finally assembled. Furthermore, by providing a separable casing in the manner herein disclosed the assembly and adjustment of the firing control mechanism and gradiometer coils is greatly facilitated by reason of a separable casing for the depth charge adapted to permit the necessary operations required to assemble and adjust the mechanism and gradient coils prior to the assembly thereof within the depth charge casing. Furthermore, by providing a separable depth charge casing composed of dielectric material, the adjustment of the mechanism and the gradiometer pickup coils is unchanged when these parts are assembled within the casing.

Briefly stated in summary, the present invention contemplates the provision of a new and improved depth charge comprising a separable casing of dielectric material having means for causing the depth charge to rotate continuously with the axis thereof in coincidence with the path of travel of the depth charge as the depth charge sinks within the water, in which the assembly and adjustment of the gradiometer pickup devices and firing mechanism controlled thereby within the depth charge casing is greatly facilitated, and in which electrical or eddy currents are not set up within the casing of the depth charge as the depth charge moves within a magnetic field whereby the gradiometer coils are continuously balanced during the movement of the depth charge within a uniform magnetic field.

While the invention has been described with respect to several particular examples thereof which give satisfactory results, it will be understood by those skilled in the art to which the invention pertains, after understanding the invention, that various changes and modifications may be employed without departing from the spirit and scope of the invention and it is our intention, therefore, in the appended claims to cover all such changes and modifications.

The invention herein described and claimed may be manufactured and used by or for the Government of the United States of America for governmental purposes without payment of any royalties thereon or therefor.

What is claimed as new and desired to be secured by Letters Patent of the United States is:

1. In a depth charge adapted to be launched within a body of water from an attacking craft, the combination of a casing comprising two separable sections of dielectric material, means for securing said sections in registered engagement with each other, signal amplifying means, a pair of oppositely connected pickup coils operatively connected to the input of said signal amplifying means adapted to detect a gradient in the magnetic field adjacent thereto, means for supporting said pickup coils in a predetermined position with respect to each other, an explosive charge arranged within said casing, and an electro-responsive device controlled by said signal amplifying means for detonating said explosive charge in response to a signal received from said pickup coils corresponding to a predetermined gradient of the magnetic field detected by the pickup coils.

2. In a depth charge of the character disclosed adapted to be launched within a body of water, a depth charge casing comprising upper and lower complementary sections composed of non-electroconductive material, a tubular member having means for supporting a pair of balanced gradiometer coils in predetermined space relation with respect thereto, means for securing said upper and lower sections of the casing to opposite ends of said tubular member in watertight relation therewith, means for securing said upper and lower sections in registered engagement with each other, a firing circuit having a source of electrical power therein, means responsive to a signal received from said gradiometer coils for closing said firing circuit selectively in accordance with the gradient of the magnetic field adjacent thereto, an explosive charge arranged within said casing, and electro-responsive means adapted to fire said explosive charge as the firing circuit is closed.

3. In a depth charge of the character disclosed adapted to sink vertically within a body of water, a nonmetallic casing for the depth charge having a pair of oppositely connected balanced pickup coils therein and comprising two separable sections, means for securing said sections together, and means for causing said sections to be rotated continuously about an axis concurrently with the endwise movement of said casing downward through the water along said axis.

4. In a depth charge of the character disclosed adapted to be launched from an attacking craft, in combination, a depth charge casing comprising two separable complementary sections composed of non-electroconductive material, means for securing said sections to each other in watertight relation, an end ring of the same diameter as the maximum diameter of the casing, means for securing said ring to one of said sections in predetermined spaced relation with respect thereto, an impeller having an annular shroud thereon of the same diameter as said end ring, and means for securing said impeller and shroud to the other one of said sections.

5. A depth charge adapted to be launched within a body of water, a casing for said depth charge, means including a plurality of fins secured exteriorly to said casing for causing rotation thereof as the depth charge sinks within the water, a pair of balanced gradiometer coils arranged within said casing and adapted to generate electrical signals variably in accordance with the gradient of the magnetic field within which the coils are moved, an explosive charge disposed within said casing, and electro-responsive means controlled by said gradiometer coils for exploding the explosive charge selectively in accordance with the strength of said electrical signals, said casing being composed of nonmetallic material for preventing the flow of electrical currents therein sufficient to unbalance the gradiometer coils as the depth charge moves through a uniform magnetic field.

6. In a depth charge adapted to be launched within a body of water from an attacking craft, a depth charge casing comprising two separable sections, means for securing said sections together in registered engagement with each other, means for causing the depth charge to move rotatably and axially within the water with the axis thereof in coincidence with the path of travel of the depth charge through the water, and a pair of opposedly connected and balanced pickup coils arranged within said casing adapted to rotate about said axis as the depth charge sinks within the water, each of said sections being composed of nonmetallic material for preventing the unbalance of said pickup coils as the casing moves along said axis within a uniform magnetic field.

7. A nonmetallic depth charge casing comprising two complementary separable sections adapted to be brought into registered engagement with each other, means for maintaining the sections in registered engagement, a tubular member having outwardly flanged end portions adapted to be secured to the end portion of each of said sections respectively and supported thereby, means for securing said sections to said flanged portions in sealed relation therewith, a pair of balanced gradiometer coils, means for supporting the gradiometer coils by said tubular member in predetermined space relation within said casing, an explosive charge arranged about the gradiometer coils intermediate said tubular member and the casing, means including a firing mechanism arranged within said tubular member adapted to explode said explosive charge in response to a signal received from said gradiometer coils corresponding to a predetermined gradient of the magnetic field adjacent the coils, means for rotating said depth charge and gradiometer coils continuously about an axis coincident with the path of travel of the depth charge within the water, and means including said nonmetallic casing for preventing the flow of induced electrical currents within said casing sufficient to destroy the balance of said gradiometer coils as the coils are rotated about said axis within a uniform magnetic field.

8. A nonmetallic depth charge casing comprising two complementary separable sections adapted to be brought into registered engagement with each other, each of said sections having a plurality of annular reinforcing members arranged therein, means for maintaining the section in registered engagement with each other, in impeller having an annular traction member thereon of the same diameter as the depth charge casing adapted to be secured to one of said sections concentric with the axis thereof, means including a plurality of devices in threaded engagement with the reinforcing members of one of said sections for securing the impeller thereto, a second annular traction member of the same diameter as the first named traction member having a plurality of supports extending therefrom, and a plurality of devices in threaded engagement with one of the reinforcing members of the other of said sections for securing said plurality of supports to the casing whereby the second annular traction member is concentric with the axis of the casing and in predetermined spaced relation with respect thereto.

9. In a depth charge of the character disclosed adapted to be launched from an attacking craft, a depth charge casing comprising two complementary separable sections composed of nonelectroconductive material adapted to be brought into matching relation with respect to each other, means for maintaining the sections in said matched relation, a tubular member having outwardly flanged end portions adapted to be engaged by the end portion of each of said sections respectively and supported thereby, means for securing each of said sections to said flanged end portions respectively in sealed relation therewith, a plurality of fins having a shroud secured thereto adapted to direct the depth charge along a predetermined path of travel within the water, means including a plurality of fillets for securing said fins to said one of the separable sections in predetermined angular relation with respect to the axis of the depth charge casing, means including a plurality of additional fillets for securing the shroud to said fins, a pair of balanced gradiometer devices supported by said tubular member in predetermined spaced relation within said casing, an explosive charge disposed within the casing, and means arranged within said tubular member and controlled by said gradiometer devices for exploding the explosive charge in response to a predetermined gradient of the magnetic field traversed by the depth charge.

10. A streamline depth charge adapted to be launched within a body of water from an attacking craft, a nonmetallic depth charge casing comprising two complementary separable sections, means for maintaining the sections in registered engagement with each other, an explosive charged disposed within said casing, means including a pair of gradiometer pickup coils arranged in predetermined space relation within the casing for firing said explosive charge in response to the gradient of the magnetic field detected by the gradiometer coils as the depth charge sinks within the water, a cylindrical shroud, a plurality of fin members having bent over portions adapted to engage the casing and shroud respectively at uniform intervals, and means for securing the fin members at the bent over portions thereof to the casing and to the shroud respectively whereby the casing is adapted to be rotated continuously and directed along a predetermined path of travel within the water by said fin members and shroud respectively with the axis thereof in coincidence with the path of travel.

11. In a depth charge of the character disclosed, in combination, a casing having a pair of oppositely connected balanced pickup coils therein and comprising a pair of upper and lower complementary sections composed of non-electroconductive material, means for securing said pair of sections together, an end ring of at least the diameter of the casing secured to said lower section in predetermined space relation with respect thereto, and an impeller secured to said upper section having an annular shroud thereon of the same diameter as the end ring whereby the depth charge is adapted to roll along the launching rail of a vessel on said shroud and end ring and thereafter rotate continuously with the axis of the depth charge in coincidence with the path of travel thereof as the depth charge sinks within the water.

12. A depth charge casing of the character disclosed comprising a pair of upper and lower complementary sections composed of plastic material, each of said sections having an aperture arranged centrally therein, means for securing the sections together in registered engagement with each other, an introverted surface arranged on said upper section, a tubular member arranged within said apertures, means for securing the lower end of the tubular member to said lower section, means for securing the upper end of the tubular member to the upper section at the introverted surface thereof, an annular traction member adapted to be secured in space relation to the lower section concentric with the axis thereof, means for securing said annular traction member to the lower section, a second annular traction member, means including an impeller device adapted to rotate the depth charge for securing said second traction member to said upper section and concentric therewith, a pair of balanced gradiometer devices, means including a plurality of pairs of arms respectively associated with each of said gradiometer devices for supporting the gradiometer devices by said tubular member in predetermined balanced space relation within said casing, a duct arranged within one of the arms of each of said pairs having electrical conducting means therein adapted to establish an external circuit connection to said gradiometer devices, a firing control mechanism arranged within said tubular member and operatively connected to said electrical conducting means whereby the firing control mechanism is adapted to be controlled by the gradient of the magnetic field detected by said pair of gradiometer devices, an explosive charge disposed within said casing, and means controlled by said firing mechanism for firing said explosive charge while the depth charge is rotated by said impeller device during the downward travel of the depth charge within the water when the gradient of the magnetic field detected by said gradiometer devices reaches a predetermined value.

13. A streamline depth charge casing of the character disclosed comprising a pair of separable upper and lower sections, means for securing the sections together in registered engagement with each other, a plurality of bosses arranged interiorly on the lower section, an end ring of the same diameter as the casing, means including a plurality of clamping devices in engagement with said bosses for securing the end ring to said lower casing in predetermined space relation with respect thereto, a tubular member secured to said upper and lower sections and in alinement therewith, a pair of balanced gradiometer devices, means included in said tubular member for supporting said gradiometer devices in predetermined space relation within said casing, an explosive charge arranged within the casing, firing control means arranged within said tubular member adapted to fire said explosive charge selectively in accordance with a signal received from said gradiometer devices corresponding to the gradient of the magnetic field traversed by the depth charge, and means including an impeller secured to said upper section for rotating the depth charge continuously about the axis of said tubular member and maintaining said axis in coincidence with the path of travel of the depth charge as the depth charge moves downward within the water.

ROBERT H. PARK.
ARTHUR G. RUSSELL.
WALDRON S. MACDONALD.
ROBERT R. CROOKSTON.

REFERENCES CITED

The following references are of record in the file of this patent:

UNITED STATES PATENTS

| Number | Name | Date |
|---|---|---|
| 330,227 | Gibbins | Nov. 10, 1885 |
| 542,732 | Huskisson | July 16, 1895 |
| 1,316,917 | Montero | Sept. 23, 1919 |
| 1,343,969 | Hampton | June 22, 1920 |
| 1,384,841 | Lundell | July 19, 1921 |
| 1,466,915 | Nichols | Sept. 4, 1923 |
| 1,780,592 | Johansson | Nov. 4, 1930 |
| 2,252,059 | Barth | Aug. 12, 1941 |
| 2,406,870 | Vacquier | Sept. 3, 1946 |

FOREIGN PATENTS

| Number | Country | Date |
|---|---|---|
| 803,907 | France | July 20, 1936 |